United States Patent
Bøgelund et al.

(10) Patent No.: US 10,498,861 B2
(45) Date of Patent: Dec. 3, 2019

(54) METHOD AND APPARATUS FOR SERVING AND MANAGING STORAGE OF DATA STREAMS IN A SURVEILLANCE AND/OR MONITORING SYSTEM

(71) Applicant: Canon Europa N.V., Amstelveen (NL)

(72) Inventors: Carsten Bøgelund, Roskilde (DK); John Madsen, Regstrup (DK); Klaus Klausen, Vallensbaek (DK); Preben Holm Nielsen, Kastrup (DK)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 15/347,550

(22) Filed: Nov. 9, 2016

(65) Prior Publication Data
US 2017/0134532 A1    May 11, 2017

(30) Foreign Application Priority Data
Nov. 11, 2015 (GB) .................... 1519896.3

(51) Int. Cl.
*H04L 29/06* (2006.01)
*H04L 12/24* (2006.01)
(Continued)

(52) U.S. Cl.
CPC ............. *H04L 67/42* (2013.01); *H04L 41/12* (2013.01); *H04L 41/22* (2013.01); *H04L 65/4084* (2013.01); *H04L 65/602* (2013.01); *H04L 67/1095* (2013.01); *H04L 67/1097* (2013.01); *H04L 67/28* (2013.01); *G06F 16/2282* (2019.01)

(58) Field of Classification Search
CPC ......... H04L 67/42; H04L 67/28; H04L 41/12; H04L 65/602; H04L 65/4084; H04L 41/22; H04L 67/1097; H04L 67/1095; G06F 16/2282
See application file for complete search history.

(56) References Cited

U.S. PATENT DOCUMENTS 5,506,844 A * 4/1996 Rao .................. H04J 3/1688
370/468
2003/0236895 A1* 12/2003 Ohkubo ............ H04N 7/17318
709/229
(Continued)

FOREIGN PATENT DOCUMENTS

WO      2009158365 A2    12/2009

*Primary Examiner* — Michael A Keller
(74) *Attorney, Agent, or Firm* — Canon U.S.A., Inc. IP Division

(57) ABSTRACT

The invention relates to methods and apparatuses for managing storage and serving of data streams generated by peripheral devices in a system for surveillance and/or monitoring. According to one aspect, the method comprises the steps of obtaining a configuration table, the configuration table comprising a list of one or more recording servers storing data segments generated by the peripheral device; building an association table, the association table comprising, for each recording server of the list, identifiers of data segments of the data stream stored therein; determining, based on the association table, the recording server storing a requested data segment; obtaining the requested data segment from the determined recording server and serving the obtained data segment.

8 Claims, 8 Drawing Sheets

(51) Int. Cl.
*H04L 29/08* (2006.01)
*G06F 16/22* (2019.01)

(56) References Cited

U.S. PATENT DOCUMENTS

| | | | |
|---|---|---|---|
| 2005/0168580 A1* | 8/2005 | Fukushima | H04N 5/765 348/207.99 |
| 2006/0279628 A1* | 12/2006 | Fleming | G11B 27/034 348/143 |
| 2012/0239892 A1 | 9/2012 | Peters et al. | |

* cited by examiner

600

601 602 603 604

| Peripheral device id | Data type | Recording server id | Current recording server |
|---|---|---|---|
| @ip1 | Video | @ip3 | 1 |
| @ip2 | Audio | @ip3 | 1 |

| Peripheral device id | Data type | Recording server id | Current recording server |
|---|---|---|---|
| @ip1 | Video | @ip3 | 0 |
| @ip2 | Audio | @ip3 | 1 |
| @ip1 | Video | @ip4 | 1 |

| 701 | 702 | 703 | 704 | 715 |
| --- | --- | --- | --- | --- |
| Peripheral device id | Data type | Recording server id | Current recording server | Segments ids |
| @ip1 | Video | @ip3 | 1 | [ts1, ts2] |
| @ip2 | Audio | @ip3 | 1 | track 1; track 4; tracks 10-15; |

| 701 | 702 | 703 | 704 | 715 |
| --- | --- | --- | --- | --- |
| Peripheral device id | Data type | Recording server id | Current recording server | Segments ids |
| @ip1 | Video | @ip3 | 0 | [ts1, ts2] |
| @ip2 | Audio | @ip3 | 1 | Track 1; track 4; tracks 10-15; |
| @ip1 | Video | @ip4 | 1 | [ts3, ts4] |

Figure 7B

METHOD AND APPARATUS FOR SERVING AND MANAGING STORAGE OF DATA STREAMS IN A SURVEILLANCE AND/OR MONITORING SYSTEM

CROSS-REFERENCE TO RELATED APPLICATIONS

This application claims the benefit under 35 U.S.C § 119(a)-(d) of United Kingdom Patent Application No. 1519896.3, filed on Nov. 11, 2015 and entitled "Method and apparatus for serving and managing storage of data streams in a surveillance and/or monitoring system".

The above cited patent application is incorporated herein by reference in its entirety.

FIELD OF THE INVENTION

The invention relates to methods and apparatuses for managing storage and serving of data streams generated by peripheral devices in a system for surveillance and/or monitoring.

Systems for surveillance and/or monitoring typically comprise a plurality of peripheral devices generating data streams such as cameras, audio devices, sensors, etc. and one or more recording servers for storing the generated data streams. The data streams are usually segmented into data segments of manageable sizes prior their storage. The data streams are then retrieved from the recording servers for live or playback streaming for viewing and/or analysis at a client side.

In these systems, a single recording server stores all data segments generated by a peripheral device, thereby all the data segments are located at the same server and retrieval is made easier.

A problem arises when a new recording server needs to be added to the surveillance and/or monitoring system for storing new recordings. This may be necessary for example when a disk on a recording server is overloaded or needs to be upgraded. One way of addressing the problem is to transfer the content of the old recording server to the new recording server to have all the recordings of a given peripheral device at a same place. However, most of the recordings are not stored permanently and are eventually deleted when their retention time expires. Accordingly, transferring these recordings would cause unnecessary waste of processing and network resources. Also, old recording sever usually needs to be kept to increase the total storage capacity.

What is needed is therefore a surveillance and/or monitoring system in which the number of recording servers can be adapted in a flexible manner while keeping the recording and retrieval of data transparent for an operator and without overconsuming processing or network resources.

SUMMARY OF THE INVENTION

According to a first aspect of the present invention there is provided a method of serving data segments of a data stream generated by a peripheral device in a surveillance and/or monitoring system, the method comprising obtaining a configuration table, the configuration table comprising a list of one or more recording servers storing data segments generated by the peripheral device, building an association table, the association table comprising, for each recording server of the list, identifiers of data segments of the data stream stored therein, and upon receiving a request for serving a data segment of the data stream, the method further comprising determining, based on the association table, the recording server storing the requested data segment, obtaining the requested data segment from the determined recording server, and serving the obtained data segment.

An effect of this method is the data segments can be served by a recording server irrespectively from where the data segments are stored. A number of required recording servers can be added in a flexible manner while keeping retrieval of data segments transparent for a requester without overconsuming processing or network resources.

In one implementation, the building of the association table comprises receiving, for each recording server of the list, identifiers of data segments generated by the peripheral device and stored at said recording server. Direct communications can thus be established with the relevant recording servers.

Optionally, the receiving of the identifiers is carried out in response to a message sent to each recording server of the list, the message comprising an identifier of the peripheral device. The association table can be built efficiently as identifiers of the data segments are received by requesting only the relevant recording servers by means of the configuration table.

In one implementation, the steps of the method are executed at a first recording server. The serving of the data segments can then be distributed among the recording servers.

In one variant, the request is received from a client device and wherein the obtained data segment is served to the client device.

In another variant, the request is received from a second recording server and wherein the obtained data segment is served to the second recording server.

In one implementation, if the recording server determined at the determining step is the first recording server, the obtaining step comprises reading the determined data segment from the storage unit attached to the first recording server, and if the recording server determined at the determining step is a second recording server, the obtaining step comprises sending a request to the second recording server of retrieving the determined data segment.

Advantageously, the configuration table is obtained from a management server. The management server may thus hold centrally the configuration of the system and the update of the system configuration is made easier.

Advantageously, the building of the association table is performed prior the receiving of the request. The building and the update (maintenance) of the association table (synchronization process) before a data segment needs to be retrieved is advantageous as it allows for quicker responses.

Advantageously, the building of the association table is performed as a background task depending on the availability of the resources or at regular time intervals. The building and the update (maintenance) of the association table (synchronization process) in background allows amongst others to take benefit from idle times in the processing resources or bandwidth usage to increase system efficiency According to a second aspect of the present invention there is provided an apparatus for serving data segments of a data stream generated by a peripheral device in a surveillance and/or monitoring system, the apparatus comprising means for obtaining a configuration table, the configuration table comprising a list of one or more recording servers storing data segments generated by the peripheral device, means for building an association table, the association table comprising, for each recording server of the list, identifiers of data segments of the data stream stored therein, means for receiving a request for serving a data segment of the data stream, means for determining, based on the association table, the recording server storing the requested data segment, means for obtaining the requested data segment from the determined recording server, and means for serving the obtained data segment.

According to a third aspect of the present invention there is provided a method of managing the storage of data segments of a data stream generated by a peripheral device in a surveillance and/or monitoring system, the surveillance and/or monitoring system comprising a management client, a management server and a plurality of recording servers, the method comprising the following steps executed by the management client obtaining a configuration table from the management server, the configuration table comprising an identifier of a first recording server currently associated with the peripheral device for storing data segments generated by the peripheral device, obtaining, from a user via a user interface, an identifier of a second recording server intended for storing data segments generated by the same peripheral device, transmitting a configuration information to the management server for updating a configuration table stored therein, wherein the configuration information comprises the identifier of the second recording server and an indication for changing the recording server currently associated with the peripheral device from the first to the second recording server while keeping the first recording server associated with the peripheral device.

According to a fourth aspect of the present invention there is provided a method of of managing the storage of data segments of a data stream generated by a peripheral device in a surveillance and/or monitoring system, the surveillance and/or monitoring system comprising a management client, a management server and a plurality of recording servers, the method comprising the following steps executed by the management server maintaining a configuration table comprising an association between an identifier of the peripheral device, an identifier of a first recording server, and an indication that the first recording server is currently assigned for storing data segments generated by the peripheral device, receiving a configuration information from a management client, the configuration information comprising an identifier of a second recording server and an indication for changing the recording server currently associated with the peripheral device from the first to the second recording server while keeping the first recording server associated with the peripheral device, and updating the configuration table, wherein the updating comprising adding a new association in the configuration table between the identifier of the peripheral device, an identifier of the second recording server, and an indication that the second recording server is currently assigned for storing data segments generated by the peripheral device, and changing the indication in the association between the identifier of the peripheral device and the identifier of the first recording server to indicate that the first recording server is not currently assigned for storing data segments generated by the peripheral device.

According to a fifth aspect of the present invention there is provided a management client for managing the storage of data segments of a data stream generated by a peripheral device in a surveillance and/or monitoring system, the surveillance and/or monitoring system comprising the management client, a management server and a plurality of recording servers, the management client comprising means for obtaining a configuration table from the management server, the configuration table comprising an identifier of a first recording server currently associated with the peripheral device for storing data segments generated by the peripheral device, means for obtaining, from a user via a user interface, an identifier of a second recording server intended for storing data segments generated by the same peripheral device, means for transmitting a configuration information to the management server for updating a configuration table stored therein, wherein the configuration information comprises the identifier of the second recording server and an indication for changing the recording server currently associated with the peripheral device from the first to the second recording server while keeping the first recording server associated with the peripheral device.

According to a sixth aspect of the present invention there is provided a management server for managing the storage of data segments of a data stream generated by a peripheral device in a surveillance and/or monitoring system, the surveillance and/or monitoring system comprising a management client, the management server and a plurality of recording servers, the management server comprising means for maintaining a configuration table comprising an association between an identifier of the peripheral device, an identifier of a first recording server, and an indication that the first recording server is currently assigned for storing data segments generated by the peripheral device, means for receiving a configuration information from a management client, the configuration information comprising an identifier of a second recording server and an indication for changing the recording server currently associated with the peripheral device from the first to the second recording server while keeping the first recording server associated with the peripheral device, and means for updating the configuration table, wherein the updating means is configured to add a new association in the configuration table between the identifier of the peripheral device, an identifier of the second recording server, and an indication that the second recording server is currently assigned for storing data segments generated by the peripheral device, and change the indication in the association between the identifier of the peripheral device and the identifier of the first recording server to indicate that the first recording server is not currently assigned for storing data segments generated by the peripheral device.

Another aspect of the invention relates to a surveillance and/or monitoring system having a recording server, a management client and a management server as defined above.

Another aspect of the invention relates to a non-transitory computer-readable medium storing a program which, when executed by a processing unit of a device in a surveillance and/or monitoring system, causes the device to perform any method defined above.

The non-transitory computer-readable medium and the devices an apparatus defined above may have features and advantages that are analogous to those set out in relation to the methods defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the present invention will now be described, by way of example only, with reference to the accompanying drawings in which:

FIGS. 6A-6B show an example of content of a configuration table.

FIGS. 7A-7B show an example of content of an association table.

DESCRIPTION OF THE EMBODIMENTS

Figure 1:
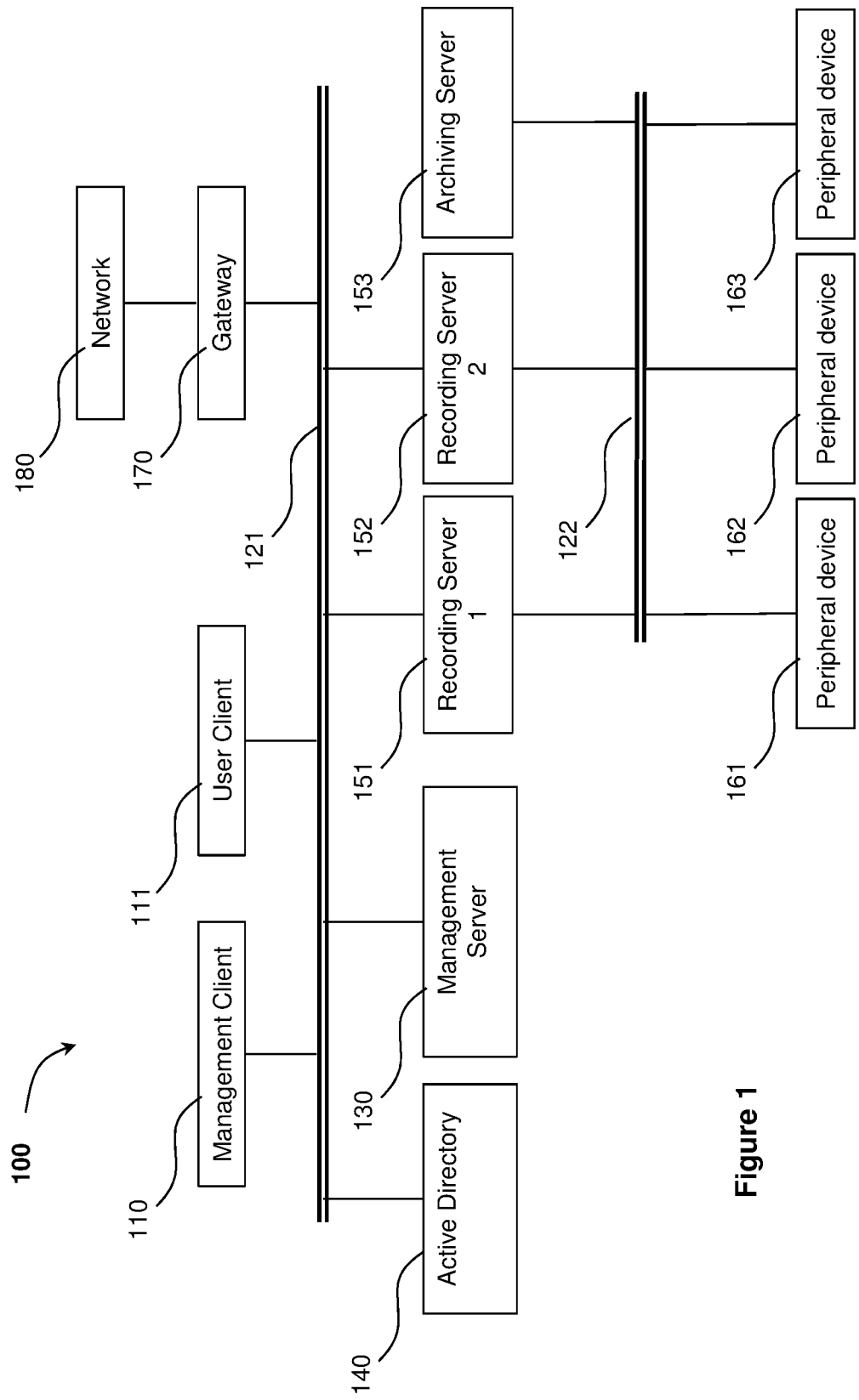
FIG. 1 illustrates an example of a surveillance system.

FIG. 1 shows an example of a surveillance/monitoring system 100 in which embodiments of the invention can be implemented. The system 100 comprises a management server 130, two recording servers 151-152, an archiving server 153 and peripheral devices 161-163.

Peripheral devices 161-163 represent source devices capable of feeding the system with data streams. Typically, a peripheral device is a video camera (e.g. IP camera, PTZ camera, analog camera connected via a video encoder). A peripheral device may also be of any other type such as an audio device, a detector, etc.

The recording servers are provided to store data streams (recordings) generated by peripheral devices such as video streams captured by video cameras. A recording server may comprise a storage unit and a database attached to the recording server. The database attached to the recording server may be a local database located in the same computer device than the recording server, or a database located in a remote device accessible to the recording server.

A data stream may be segmented into data segments for the data stream to be stored in or read from a storage unit of a recording server. The segments may be of any size. A segment may be identified by a time interval [ts1, ts2] where ts1 corresponds to a timestamp of the segment start and ts2 corresponds to a timestamp of the segment end. The timestamp may correspond to the capture time by the peripheral device or to the recording time in a first recording server. The segment may also be identified by any other suitable segment identifier such as a sequence number, a track number or a filename.

The management server 130 stores information regarding the configuration of the surveillance/monitoring system 100 such as conditions for alarms, details of attached peripheral devices (hardware), which data streams are recorded in which recording server, etc.

A management client 110 is provided for use by an administrator for configuring the surveillance/monitoring system 100. The management client 110 displays an interface for interacting with the management software on the management server in order to configure the system, for example for adding a new peripheral device (hardware) or moving a peripheral device from one recording server to another as it will be detailed later according to embodiments of the invention. The interface displayed at the management client 110 allows also to interact with the management server 130 for controlling what data should be input and output via a gateway 170 to an external network 180.

A user client 111 is provided for use by a security guard or other user in order to monitor or review the output of peripheral devices 161-163. The user client 111 displays an interface for interacting with the management software on the management server in order to view images/recordings from the peripheral devices 161-163 or to view video footage stored in the recording servers 151-152.

The archiving server 153 is used for archiving older data stored in the recording servers 151-152, which does not need to be immediately accessible from the recording servers 151-152, but which it is not desired to be deleted permanently.

Other servers may also be present in the system 100. For example, a fail-over recording server (not illustrated) may be provided in case a main recording server fails. Also, a mobile server (not illustrated) may be provided to allow access to the surveillance/monitoring system from mobile devices, such as a mobile phone hosting a mobile client or a laptop accessing the system from a browser using a web client.

Management client 110 and user client 111 are configured to communicate via a network/bus 121 with the management server 130, an active directory server 140, a plurality of recording and archiving servers 151-153, and a plurality of peripheral devices 161-163. The recording and archiving servers 151-153 communicate with the peripheral devices 161-163 via a network/bus 122. The surveillance/monitoring system 100 can input and output data via a gateway 170 to an external network 180.

The active directory server 140 is an authentication server that controls user log-in and access, for example from management client 110 or user client 111, to the surveillance/monitoring system 100.

Figure 2:
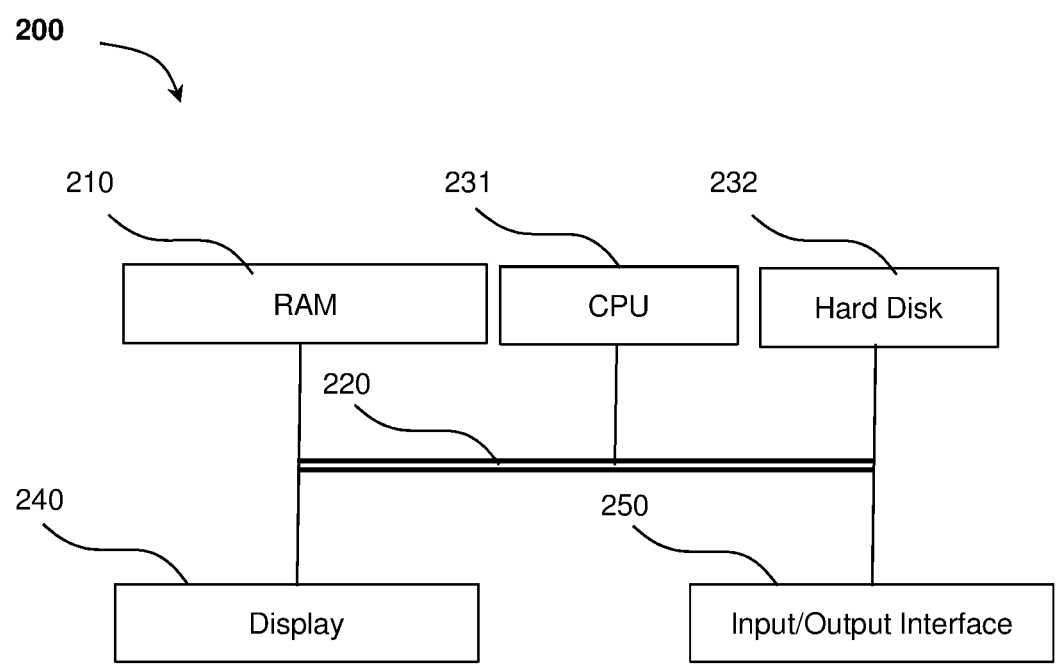
FIG. 2 illustrates a hardware configuration of a computer device adapted to embody embodiments of the invention.

FIG. 2 shows a typical arrangement for a computer 200, configured to implement at least one embodiment of the present invention. The computer 200 comprises a communication bus 220 to which there are preferably connected:

a. a central processing unit 231, such as a microprocessor, denoted CPU;

b. a random access memory 210, denoted RAM, for storing the executable code of methods according to embodiments of the invention as well as the registers adapted to record variables and parameters necessary for implementing methods according to embodiments of the invention; and c. an input/output interface 250 configured so that the computer 200 can communicate with other devices.

Optionally, the computer device 200 may also include a data storage means 232 such as a hard disk for storing data and a display 240.

The executable code loaded into the RAM 210 and executed by the CPU 231 may be stored either in read only memory (not illustrated), on the hard disk 232 or on a removable digital medium (not illustrated).

The display 240 is used to convey information to the user typically via a user interface. The input/output port 250 allows a user to give instructions to the computer 200 using a mouse and a keyboard, receives data from other devices, and transmits data via the network.

The clients 110-111, the management server 130, the active directory 140, the recording servers 151-152 and the archiving server 153 have a system architecture consistent with the computer 200 shown in FIG. 2. The description of FIG. 2 is greatly simplified and any suitable computer architecture may be used.

Figure 3:
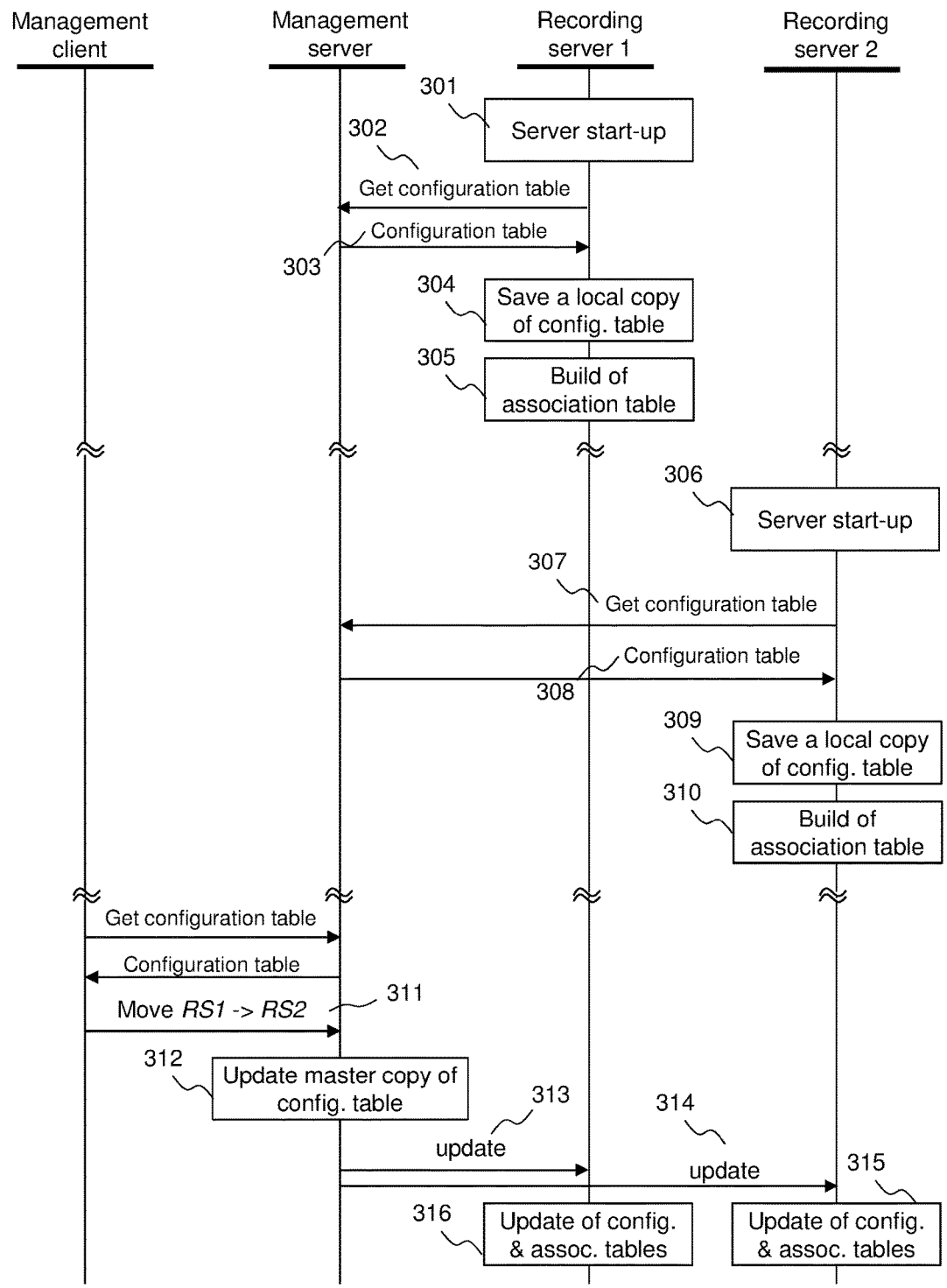
FIG. 3 is a flowchart for schematically describing the move of a peripheral device from a first recording server to a second recording server, according to an exemplary embodiment.

FIG. 3 is a flowchart for schematically describing the move of a peripheral device (hardware) from a first recording server to a second recording server, according to an exemplary embodiment. Moving a peripheral device means here at least reconfiguring the connections so that new recordings generated by the peripheral device are directed to the second recording server instead of the first recording server.

For illustration, we consider the surveillance/monitoring system 100 of FIG. 1 in which we assume that peripheral device 161 is to be transferred from recording server 1 (151) to recording server 2 (152). Recording server 2 is for example a newly added server with storage unit having large free storage capacity.

The management server 130 holds in an attached database (locally or remotely located) a configuration table that indicates which peripheral device is connected to which recording server. The table stored at the management server represents the base version in the system and it is referred to as master copy. FIG. 6A shows an example of content of such configuration table.

Configuration table 600 illustrated in FIG. 6A comprises a peripheral device identification field 601, a data type field 602, an identification field 603 of the recording server and a current recording server field 604.

Identification fields 601 and 603 contain identifiers such as IP addresses or names for uniquely identifying the peripheral device and the recording server. In the example, @ip1 is the IP address of peripheral device 161, @ip2 is the IP address of peripheral device 162 and @ip3 is the IP address of recording server 151.

The data type field 602 is an optional field indicating the type of data streamed by the device such as "video" and "audio". Here peripheral device 161 (@ip1) is assumed to be a camera device generating video data and peripheral device 162 (@ip2) is assumed to be a microphone generating audio data.

Current recording server field 604 indicates whether the recording sever of the corresponding entry is currently the current server for storing the generated data stream. The current server (or associated server) is the recording server towards which data generated by a peripheral device is directed for storage. Note that the indication "current server" is peripheral device-dependent; a given recording server may be configured at the same time as the current recording server for one peripheral device and not the current recording server for another peripheral device, or similarly, two recordings servers may be current servers at the same time for two different peripheral devices.

In the illustration of FIG. 6A, a value "1" in field 604 indicates that the corresponding recording server is the current recording server. This is the case for the recording server @ip3 which is the current recording server for both peripheral devices @ip1 and @ip2. A value "0" in the field 604 indicates that the recording server holds data previously generated by the corresponding peripheral device but this recording server is not currently attached to that peripheral device, i.e. not currently configured to receive data streams from that peripheral device. Illustration of the use of value "0" is given in FIG. 6B.

Back to the description of FIG. 3, after start-up (301) of recording server 1 (151), a copy of the configuration table is requested (302) from the management server 130 and the received copy (303) is stored in a database attached to recording server 1 (304). The requested copy of the configuration table may be a partial or total reproduction of the master copy managed by the management server.

Based on the received copy of the configuration table, the recording server 1 (151) builds an association table (305) comprising associations between identifiers of peripheral devices, identifiers of data segments generated by associated peripheral devices and identifiers of recording servers storing associated data segments. In one implementation, the association table is constructed by adding one column to the configuration table comprising identifiers of the stored data segments for each couple (peripheral device, recording server). Of course, not all information contained in the master copy of the configuration table is necessary to keep for the recording server, e.g. entries pertaining to peripheral devices which none of their generated data segments are stored in the recording server can be skipped. That unnecessary information is either filtered while requesting a copy of the configuration table from the management server or during the building of the association table.

FIG. 7A shows an example of an association table 700 built based on the configuration table 600 of FIG. 6A. Field 715 listing the identifiers of the data segments stored in the associated recording server has been added (one data segment from @ip1 identified by its time interval [ts1, ts2] and 8 audio tracks from @ip2 identified by track numbers 1, 4 and 10-15). This information is known to the recording server when storing the data segments; either it is received from the source peripheral device with the data segments or generated locally at the time of storing the data segments. In any case, different data segments from same peripheral device should have different identifiers to maintain the identification unique within each recording server and across recording servers. In this example, the other fields 701-704 are kept the same as their corresponding fields 601-604 of table 600.

Steps 307-310 of FIG. 3 are executed by recording server 2 (152) after its start-up (306). These steps are similar to corresponding steps 302-305 executed after the start-up (301) of recording server 1 (151), and their description will be omitted. Recording server 2 (152) may be a newly installed server added to the system.

When peripheral device 161 is moved (311), the configuration table stored at the management server (master copy) is updated (312) to show that the peripheral device 161 is now connected to recording server 2 (152). Still, the management server maintains in its master copy the information that part of the recordings from peripheral device 161 are available on recording server 1 (151), until they are deleted. Details on the update of the master copy of the configuration table are provided with reference to FIGS. 8 and 9.

FIG. 6B shows the status of the master copy of the configuration table 600 after update. A new entry has been added indicating that recording server 2 (@ip4; 152) is now connected to peripheral device @ip1 (161) as current server ("1" in field 604) for storing the video streams generated by this device. Initial entry for recording server 1 (@ip3; 151) is kept in the table at least as long as data from peripheral device @ip1 (161) is still present in recording server 1, however corresponding field 604 is updated to indicate that the server is no longer the current recording server ("0" in field 604) for peripheral device @ip1 (161).

Consequently, after the transfer, recordings from peripheral device 161 are recorded on recording server 2 (152) and some data segments generated before the transfer, which have not yet been archived or deleted, will still be left at recording server 1.

Since a change occurred at the master copy (312), the management server 130 propagates the change to, at least, the concerned recording servers e.g. via messages 313, 314. The concerned recording servers in this example are recording servers 151 and 152. In response to the received messages, the recording servers 151 and 152 update their corresponding local copy of configuration tables and association tables (315, 316).

FIG. 7B shows how the update is reflected in the association table 700 built at recording server 1 (151). It is assumed in the example that a data segment corresponding to the time interval [ts3, ts4] has already been stored at the recording server 2 (@ip4, 152). An entry of association table 700 at recording server 1 points thus on a data segment recorded on recording server 1. Conversely, association table built at recording server 2 (not illustrated) has an entry pointing to data segments generated by peripheral device 161 and stored at recording server 1. This cross-referencing of identifiers of data segments between recording servers is typically performed by exchanging messages between the servers. Each recording server knows from the configuration table provided by the management server which other recording server is holding data originating from the same peripheral device. Each recording server may thus communicate the list (of identifiers) of data segments stored in its local database to all other recording servers listed in the configuration table for the same peripheral device (for peripheral device @ip1, recording server @ip3 would then communicate the identifier [ts1, ts2] to recording server @ip4, and recording server @ip4 communicates the identifier [ts3, ts4] to recording server @ip3). In a variant, only the current recording server has to know in which recording server each data segment, generated by the peripheral device it is responsible for, is located. This process of synchronizing recordings of shared peripherals is referred to as "synchronization process".

Figure 4:
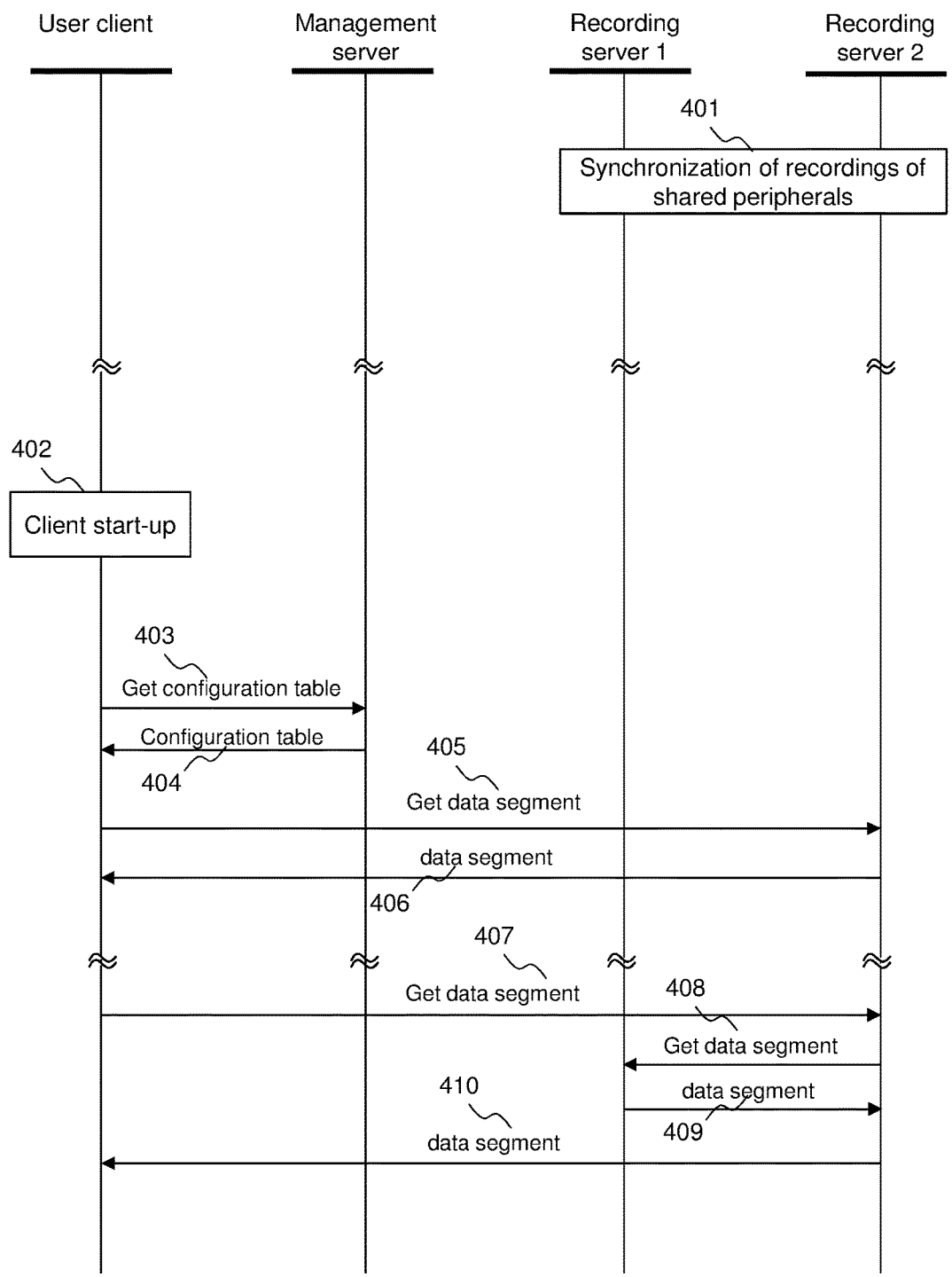
FIG. 4 is a flowchart for schematically describing the retrieval by a user client of data segments generated by a peripheral device, according to an exemplary embodiment.

The synchronization process may be executed at various occasions:
 a. on request basis, e.g. it is executed at the time a data segment needs to be retrieved following a request from a user client for example;
 b. on event basis, e.g. each time new recordings are stored in or deleted from a recording server; and/or
 c. in background at regular time intervals (e.g. step 401 in FIG. 4).

A combination of the above occasions can also be envisaged to launch the synchronization process.

Executing the synchronization process before a data segment needs to be retrieved is advantageous as it allows for quicker responses. Executing the synchronization process in background allows amongst others to take benefit from idle times in the processing resources or bandwidth usage to increase system efficiency.

Part of the synchronization process is that when all recordings from peripheral device 161 are deleted (or archived) from recording server 1, recording server 2 deletes the entries in its association table that point to data segments previously stored on recording server 1. In this event, the management server updates its master copy of the configuration to indicate that all recordings are now stored at recording server 2 (and no more recordings at recording server 1) and propagates the updated table to, at least, the concerned recording servers. The management server may be aware of this event either from recording server 1 which performed the delete, or because the management server knows about when data is to be deleted or archived from the recording servers as this information is part of the system configuration set and stored at the management server.

FIG. 4 is a flowchart for schematically describing the retrieval by a user client (111) of data segments generated by a peripheral device, according to an exemplary embodiment. Same context as that of FIG. 3 is assumed here; i.e. we consider the surveillance/monitoring system 100 of FIG. 1 in which both recording server 1 (151) and recording server 2 (152) are holding data streams generated by same peripheral device 161 (transfer already performed). It is also assumed that the two association tables at the recording servers 1 and 2 have already been created.

The process of synchronization of recordings (401) discussed above with reference to FIG. 7B to populate the identifiers of the data segments stored at each server (field 715) is assumed to be executed here in background prior any user client request is generated to ensure quicker responses.

After start-up (402) of user client device (111), a copy of the configuration table is requested (403) from the management server 130 and the received copy (404) is stored locally at the user client. The user client determines from the received configuration table the current recording server associated with the peripheral device of interest. In embodiments of the invention, the current recording server is also responsible for serving data streams generated by the peripheral device associated with it, irrespective of where the requested data streams are actually stored, i.e. at the current recording server or at another recording server. Consequently, the user client has to establish a connection only with the current server for retrieving data segments generated by the peripheral device of interest. It is left to the current recording server to fetch for the requested data segments based on the association table and to serve them to the user client. This introduces great flexibility for adapting the number of recording servers and their maintenance without changing the behaviour of the user client.

In FIG. 4, message request 405 and message response 406 show an example of fetching a data segment that is stored locally at the current recording server 2, i.e. after the transfer, for example data segment [ts3, ts4]. Messages 407-410 show an example of fetching a data segment that is stored at recording server 1 (not the current server), i.e. before the transfer, for example data segment [ts1, ts2].

In a variant implementation (not illustrated), the user client requests data segments via the management server. It is assumed as above that the transfer of the peripheral device 161 from recording server 1 to recording server 2 has already been performed. In this variant, the user client requests a data segment generated by peripheral device 161 from the management server 130. The management server 130 looks at its local configuration table and sends a request to recording server 2, which is associated with the peripheral device 161 (current recording server). Recording server 2 (@ip4 152) receives the request from the management server 130 and then looks at its local association table 700. Recording server 2 either identifies that the data segment is stored locally, if it is data segment received from the peripheral device after transfer, or identifies that the data segment is for a time that is stored on recording server 1 (@ip3, 151). If the data segment is stored on recording server 1, recording server 2 retrieves the data segment from recording server 1 by a request to recording server 1 and then sends the user requested data segment to the management server, which eventually forwards it to the user client.

Figure 5:
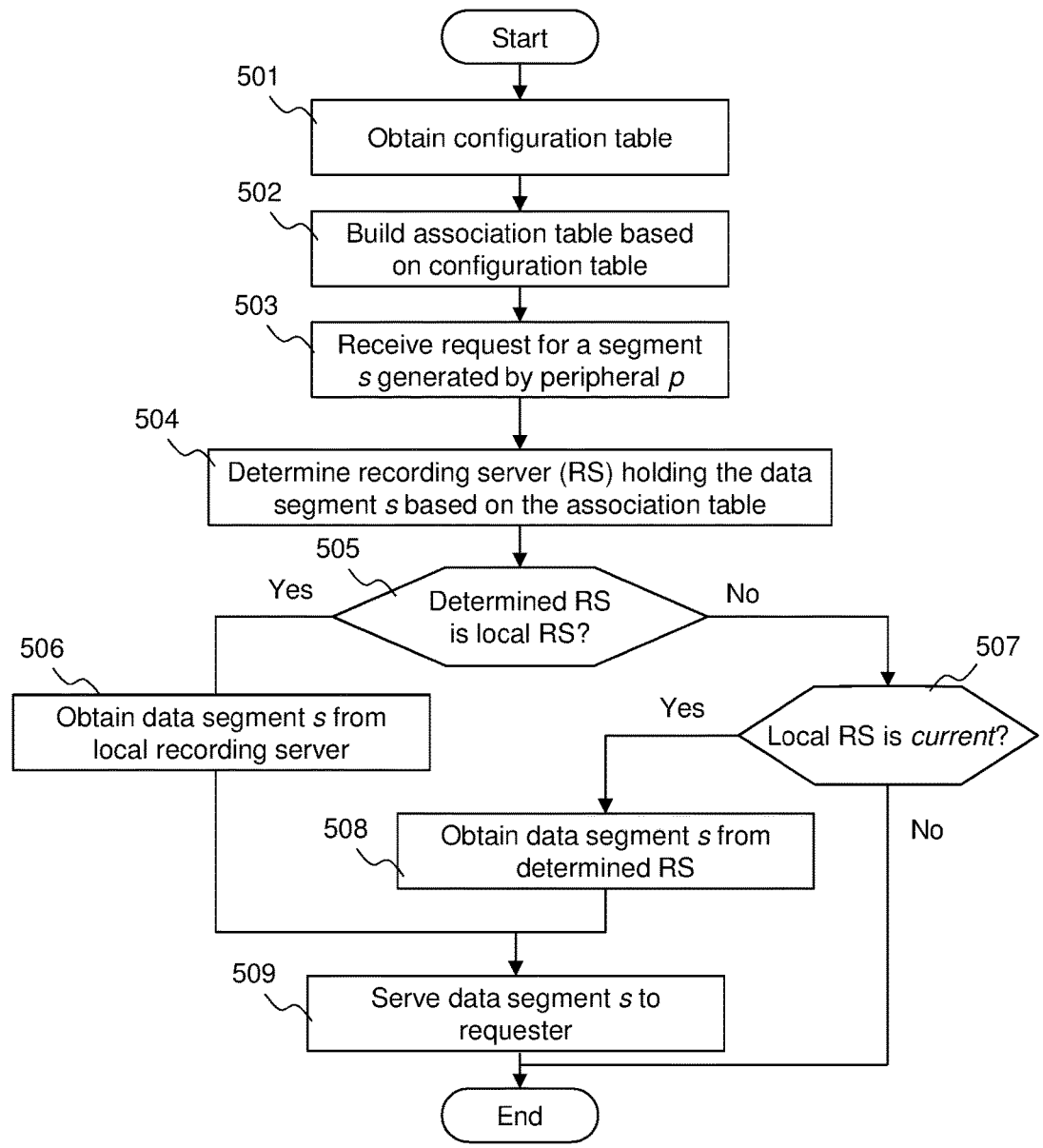
FIG. 5 is a flowchart representing the method of serving data segments described from the perspective of a given recording server according to an embodiment of the invention.

FIG. 5 is a flowchart representing a method of serving data segments described from the perspective of a given recording server (referred to as local recording server) according to an embodiment of the invention. The method is typically executed by software code executed by CPU 231 of the recording server.

First a copy of the configuration table is obtained from the management server (501) and an association table is built based on the information contained in the configuration table (502). Details of these steps have been described in FIG. 3. These steps are part of the synchronization process and are executed, according to a variant, after start-up of the recording server and whenever a change in the configuration table relevant to the recording server is detected.

At step 503, a request for a data segment s generated by a peripheral device p is received by the local recording server. This request is received either from a user client (directly or via the management server) in the case where the local recording server is the current recording server for peripheral device p, or from another recording server acting as a proxy. In this latter case, the recording server acting as proxy is the current recording server for peripheral device p.

At step 504, the local recording server determines which recording server has the requested data segment stored in its storage unit using for example information contained in fields 701, 703 and 715 of the association table.

If it is determined that the requested data segment is in the storage unit of the local recording server (test 505 positive), then the requested data segment is obtained (read) from that storage unit (506) and served to the requester (509). The requester being either the user client (directly or via the management server) or the current (proxy) recording server.

If it is determined that the requested data segment is not in the storage unit of the local recording server (test 505 negative), then a further test 507 is performed to determine if the local recording server is the current recording server for the peripheral device p, e.g. by checking field 704 of the association table. If the test 507 is positive, the data segment s is obtained from the recording server determined at step 504 (508) and served to the requester (509). The local recording server is thus acting as a proxy. The requester being here the user client (directly or via the management server). If the test 507 is negative, the request for the data segment should have been received by error and either it should be ignored or an error message should be signalled to the requester.

Figure 8:
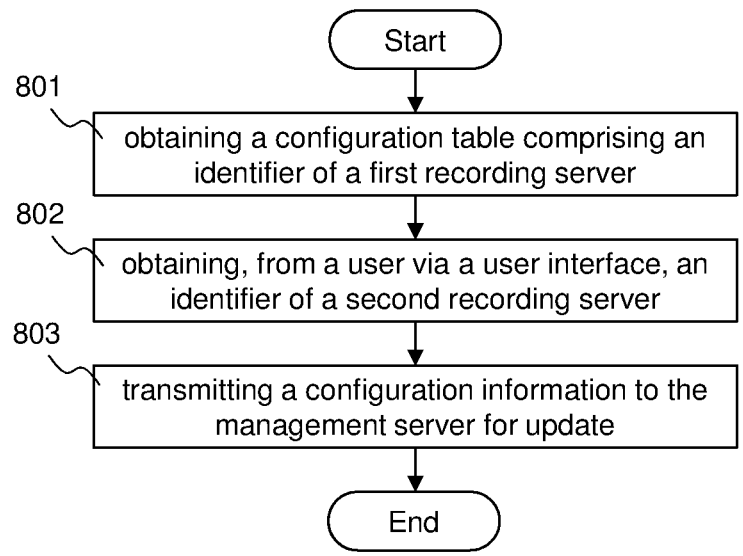
FIG. 8 is a flowchart representing a method of managing the storage of data segments generated by a peripheral device described from the perspective of management client, according to an embodiment of the invention.

FIG. 8 is a flowchart representing a method of managing the storage of data segments generated by a peripheral device described from the perspective of management client, according to an embodiment of the invention. The method is typically executed by software code executed by CPU 231 of the management client.

At step 801, a copy of the configuration table stored at the management server is obtained. The obtained copy comprising, at least, an identifier of a first recording server currently associated with the peripheral device for storing data segments generated by the peripheral device. For example, by considering the peripheral device 161 (@ip1), the step would comprise looking for the entry in the configuration table associating the peripheral device 161 (@ip1) with a recording server for which the field 604 (current recording server) is set to "1". Assuming the configuration table is in the state of FIG. 6A, identifier of recording server 1 (@ip3) is determined as the identifier of the first recording server.

At step 802, an identifier of a second recording server intended for storing future data segments generated by the same peripheral device (e.g. 161) is obtained. Typically the determination of this second recording server results from an interaction of a user via a user interface at the management client.

For example, a graphical user interface may be displayed showing a first icon representing the first recording server (e.g. recording server 1), a second icon representing the second recording server (e.g. recording server 2, 152) and a third icon representing the peripheral device. Initially, a connection may be displayed between the third icon (peripheral device) and the first icon (first recording server) for representing the current association between the first recording server and the peripheral device. A user may move graphically, e.g. drag operation using a mouse, the third icon underneath the second icon to indicate that the connection needs to be reconfigured and that the peripheral device should be associated now with the second recording server. Once the reconfiguration is done (after execution of step 803 below), the displayed connection may be changed to connect the third icon with the second icon instead of the first icon for representing the successful assignment of the second recording server as the current recording server for the peripheral device.

At step 803, a configuration information is transmitted to the management server for updating the master copy of the configuration table stored therein. The configuration information may include both an indication that the peripheral device is no longer connected to the first recording server and an indication that the peripheral device is now connected to the second recording server. These two indications representing a single action communicated to the management server.

In one implementation, the configuration information may comprise the identifier of the second recording server (@ip4) and an indication for changing the recording server currently associated with the peripheral device from the first to the second recording server. It may be implicit that the first recording server should be kept associated with the peripheral device as long as it has data segments from the peripheral device stored therein. The configuration information may be for example a copy of the modified entries of the configuration table stored locally at the management client (i.e. (@ip1, Video, @ip3, 0) and (@ip1, Video, @ip4, 1)). These transmitted entries can be used directly by the management server for updating the corresponding entries in its master copy of the configuration table.

Optionally, an acknowledgment can be transmitted back from the management server to the management client to confirm that the update has been taken into account and completed successfully.

Figure 9:
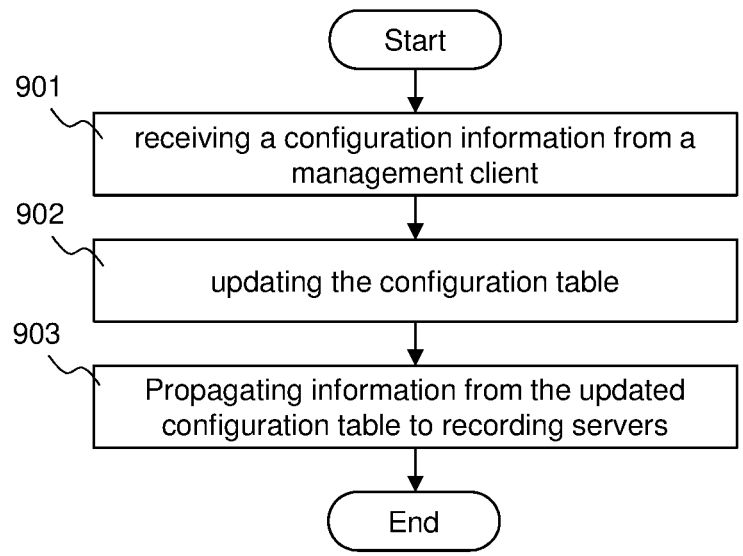
FIG. 9 is a flowchart representing a method of managing the storage of data segments generated by a peripheral device described from the perspective of the management server, according to an embodiment of the invention.

FIG. 9 is a flowchart representing a method of managing the storage of data segments generated by a peripheral device described from the perspective of the management server, according to an embodiment of the invention. The method is typically executed by software code executed by CPU 231 of the management server.

As discussed above, the management server maintain a master copy of a configuration table reflecting the configuration of the system. Before the association of a new recording server, the table comprises an association between an identifier of the peripheral device (@ip1), an identifier of a first recording server (@ip3), and an indication that the first recording server is currently assigned for storing data segments generated by the peripheral device ("1").

At step 901, a configuration information is received from the management client. In one implementation, the configuration information comprises an identifier of a second recording server and an indication for changing the recording server currently associated with the peripheral device from the first to the second recording server. It may be implicit that the first recording server should be kept associated with the peripheral device as long as it has data segments from the peripheral device stored therein. The configuration information may be for example a copy of the modified entries of the configuration table stored locally at the management client as discussed with reference to FIG. 8.

At step 902, based on the received configuration information, the master copy of the configuration table is updated. The management server may check before updating the configuration table if the association with the new (second) recording server is authorized for example. If the update is authorized an completed, an acknowledgment may optionally be sent to the management client.

The update of the configuration table may then result into:
adding a new association in the master configuration table between the identifier of the peripheral device, an identifier of the second recording server, and an indication that the second recording server is currently assigned for storing data segments generated by the peripheral device (i.e. (@ip1, [Video,] @ip4, 1)), and changing the indication in the association between the identifier of the peripheral device and the identifier of the first recording server to indicate that the first recording server is not currently assigned for storing data segments generated by the peripheral device (i.e. (@ip1, [Video,] @ip3, 0)).

At step 903, the management server may propagate the updated information to, at least the concerned devices, namely here the first and the second recording servers.

The invention claimed is:

1. A method of managing storage and retrieval of data segments of a data stream generated by a peripheral device in a video surveillance system, the video surveillance system comprising a management client, a management server and a plurality of recording servers connected with each other over a network, the method comprising the following steps:
the first recording server obtaining a configuration table from the management server, the configuration table comprising a list of one or more recording servers storing data segments generated by the peripheral device and including an association between an identifier of the peripheral device, an identifier of a first recording server, and an indication that the first recording server is currently assigned for storing data segments generated by the peripheral device;

building an association table at the first recording server, the association table comprising, for each recording server of the list, identifiers of data segments of the data stream stored therein;

receiving, at the management server, configuration information from the management client, the configuration information comprising an identifier of a second recording server and an indication for changing the recording server currently associated with the peripheral device from the first to the second recording server while keeping the first recording server associated with the peripheral device;

updating the configuration table at the management server, wherein the updating comprising:

adding a new association in the configuration table between the identifier of the peripheral device, an identifier of the second recording server, and an indication that the second recording server is currently assigned for storing data segments generated by the peripheral device, and changing the indication in the association between the identifier of the peripheral device and the identifier of the first recording server to indicate that the first recording server is not currently assigned for storing data segments generated by the peripheral device;

updating the association table at the first recording server based on the updated configuration table;

updating an association table at the second recording server based on the updated configuration table;

upon receiving a request for serving a data segment of the data stream at the second recording server, the method further comprising:

determining, based on the updated association table at the second recording server, which of the first recording server and second recording server stores the requested data segment;

obtaining the requested data segment from the determined recording server; and serving the obtained data segment.

2. The method of claim 1, wherein the building of the association table comprises a step of receiving, for each recording server of the list, identifiers of data segments generated by the peripheral device and stored at said recording server.

3. The method of claim 2, wherein the receiving of the identifiers is carried out in response to a message sent to each recording server of the list, the message comprising an identifier of the peripheral device.

4. The method of claim 1, wherein the request for serving a data segment is received from a client device and wherein the obtained data segment is served to the client device.

5. The method of claim 1, wherein:
if the recording server determined at the determining step is the second recording server, the obtaining step comprises reading the determined data segment from the storage unit attached to the second recording server, and if the recording server determined at the determining step is the first recording server, the obtaining step comprises sending a request to the first recording server to retrieve the determined data segment.

6. The method of claim 1, wherein the building of the association table is performed as a background task depending on the availability of the resources or at regular time intervals.

7. A video surveillance system for managing the storage of data segments of a data stream generated by a peripheral device, the video surveillance comprising a management client, the management server and a plurality of recording servers connected to each other over a network, the management server comprising:

means for maintaining a configuration table comprising a list of one or more recording servers storing data segments generated by the peripheral device and including an association between an identifier of the peripheral device, an identifier of a first recording server, and an indication that the first recording server is currently assigned for storing data segments generated by the peripheral device;

means for receiving configuration information from the management client, the configuration information comprising an identifier of a second recording server and an indication for changing the recording server currently associated with the peripheral device from the first to the second recording server while keeping the first recording server associated with the peripheral device; and means for updating the configuration table, wherein the updating means is configured to:

add a new association in the configuration table between the identifier of the peripheral device, an identifier of the second recording server, and an indication that the second recording server is currently assigned for storing data segments generated by the peripheral device, and change the indication in the association between the identifier of the peripheral device and the identifier of the first recording server to indicate that the first recording server is not currently assigned for storing data segments generated by the peripheral device, wherein the first recording server comprises means for building an association table, the association table comprising, for each recording server of the list, identifiers of data segments of the data stream stored therein, and, when the configuration table is updated, updating the association table based on the updated configuration table; and wherein the second recording server comprises means for updating an association table based on the updated configuration table and communication means for, upon receiving a request for serving a data segment of the data stream at the second recording server:

determining, based on the updated association table at the second recording server, which of the first recording server and second recording server stores the requested data segment;

obtaining the requested data segment from the determined recording server; and serving the obtained data segment.

8. A video surveillance system for managing the storage of data segments of a data stream generated by a peripheral device, the video surveillance comprising a management client, the management server and a plurality of recording servers connected to each other over a network, the management server comprising:

a software code portion to maintain a configuration table comprising a list of one or more recording servers storing data segments generated by the peripheral device and including an association between an identifier of the peripheral device, an identifier of a first recording server, and an indication that the first recording server is currently assigned for storing data segments generated by the peripheral device;

a software code portion to receive configuration information from the management client, the configuration information comprising an identifier of a second recording server and an indication for changing the recording server currently associated with the peripheral device from the first to the second recording server while keeping the first recording server associated with the peripheral device; and a software code portion to update the configuration table, wherein the updating code portion is configured to:

add a new association in the configuration table between the identifier of the peripheral device, an identifier of the second recording server, and an indication that the second recording server is currently assigned for storing data segments generated by the peripheral device, and change the indication in the association between the identifier of the peripheral device and the identifier of the first recording server to indicate that the first recording server is not currently assigned for storing data segments generated by the peripheral device;

wherein the first recording server comprises a software code portion to build an association table, the association table comprising, for each recording server of the list, identifiers of data segments of the data stream stored therein, and, when the configuration table is updated, updating the association table based on the updated configuration table; and wherein the second recording server comprises a software code portion to update an association table based on the updated configuration table and a software code portion for, upon receiving a request for serving a data segment of the data stream at the second recording server:

determining, based on the updated association table at the second recording server, which of the first recording server and second recording server stores the requested data segment;

obtaining the requested data segment from the determined recording server; and serving the obtained data segment.

\* \* \* \* \*

UNITED STATES PATENT AND TRADEMARK OFFICE
CERTIFICATE OF CORRECTION

PATENT NO. : 10,498,861 B2
APPLICATION NO. : 15/347550
DATED : December 3, 2019
INVENTOR(S) : Carsten Bøgelund et al.

Page 1 of 1

It is certified that error appears in the above-identified patent and that said Letters Patent is hereby corrected as shown below:

On the Title Page

Item [71], delete "Cannon Europa N.V., Amstelveen (NL)" and insert – Canon Kabushiki Kaisha, Tokyo (JP)--.

Signed and Sealed this
Twenty-eighth Day of January, 2020

Andrei Iancu
*Director of the United States Patent and Trademark Office*